United States Patent
Maruyama

(10) Patent No.: US 12,497,755 B2
(45) Date of Patent: Dec. 16, 2025

(54) WORKING VEHICLE

(71) Applicant: TAKEUCHI MFG. CO., LTD., Nagano (JP)

(72) Inventor: Shota Maruyama, Sakaki-machi (JP)

(73) Assignee: TAKEUCHI MFG. CO., LTD. (JP)

( * ) Notice: Subject to any disclaimer, the term of this patent is extended or adjusted under 35 U.S.C. 154(b) by 0 days.

(21) Appl. No.: 18/979,783

(22) Filed: Dec. 13, 2024

(65) Prior Publication Data

US 2025/0305244 A1     Oct. 2, 2025

(30) Foreign Application Priority Data

Mar. 29, 2024   (JP) .................................. 2024-057107

(51) Int. Cl.
*E02F 9/18*    (2006.01)
*E02F 9/08*    (2006.01)

(52) U.S. Cl.
CPC .............. *E02F 9/18* (2013.01); *E02F 9/0808* (2013.01)

(58) Field of Classification Search
CPC .................................. E02F 9/18; E02F 9/0808
See application file for complete search history.

(56) References Cited

U.S. PATENT DOCUMENTS

| 3,459,353 A * | 8/1969 | Taylor ................... A47K 10/36 |
| | | 226/132 |
| 7,669,898 B2 * | 3/2010 | Hamaguchi ............... E02F 9/18 |
| | | 280/759 |
| 2018/0087478 A1 * | 3/2018 | Matsumiya ............... E02F 9/10 |

FOREIGN PATENT DOCUMENTS

| CN | 108643273 A | 10/2018 | |
| CN | 114454973 A * | 5/2022 | |
| EP | 1260637 A1 | 11/2002 | |
| EP | 2428617 A1 * | 3/2012 | ............ E02F 9/0808 |
| JP | 3459353 B2 | 10/2003 | |
| KR | 20100091443 A | 8/2010 | |

OTHER PUBLICATIONS

Translation of CN-114454973-A.*
Translation of EP-2428617-A1.*
European Search Report issued in the corresponding European Patent Application No. 24220143.2; dated Mar. 27, 2025 (total 8 pages).

* cited by examiner

Primary Examiner — Paul N Dickson
Assistant Examiner — Shams Dhanani
(74) Attorney, Agent, or Firm — Harness, Dickey & Pierce, P.L.C.

(57) ABSTRACT

A working vehicle is provided that can easily perform a mounting and detaching operation of a battery therein. A working vehicle includes: a body frame; and a counterweight that is mounted on a vehicle rear portion of the body frame. The counterweight is mounted on the body frame by a plurality of fixing bolts that threadedly engage with the counterweight by way of the body frame from a lower surface side of the body frame.

7 Claims, 5 Drawing Sheets

WORKING VEHICLE

CROSS REFERENCE TO RELATED APPLICATIONS

This application claims priority to Japanese Patent Application No. 2024-057107, filed on Mar. 29, 2024, which is expressly incorporated herein by reference in its entirety.

BACKGROUND

Technical Field

The present invention relates to a working vehicle.

Related Art

In a working vehicle for a civil engineering equipment, a construction equipment or the like, in general, a body frame is mounted on a traveling device, and an engine, a battery, a working oil tank, a slew motor, a hydraulic pump, a control valve and the like are mounted on the vehicle body frame. A pair of left and right longitudinal ribs is fixed by welding to both sides of the body frame in the vehicle width direction, and, further, a lateral rib that connects the pair of left and right longitudinal ribs is provided. Rigidity of the working vehicle is increased by the pair of longitudinal ribs and the lateral rib (for example, see Japanese Patent No. 3459353).

In the above-mentioned working vehicle, to increase operational stability of the working vehicle, a counterweight is mounted on the body frame. The counterweight is mounted on the lateral rib "by making fixing bolts threadedly engage with counterweight mounting female threads formed in a mounting base from above by way of the mounting base disposed on an upper side of the lateral rib"

In the working vehicle having such a configuration, in a case where a battery is disposed on a rear side of the vehicle and the lateral rib is disposed behind the battery, at the time of mounting the battery on the vehicle or dismounting the battery from the vehicle, the battery cannot be mounted or dismounted unless the battery is lifted up largely and hence, a detachable mounting operation of the battery is difficult.

In view of the above-mentioned circumstances, it is an object of the present invention to provide a working vehicle that can easily perform a detachable mounting operation of a battery on the working vehicle.

SUMMARY (1) A working vehicle according to the present invention includes: a body frame; and a counterweight that is mounted on a vehicle rear portion of the body frame. The counterweight is mounted on the body frame by a plurality of fixing bolts that threadedly engage with the counterweight by way of the body frame from a lower surface side of the body frame.
(2) In the working vehicle according to the present invention, it is preferred that the body frame include a tying-down portion on the vehicle rear portion, and a recessed portion for exposing the tying-down portion be formed on a lower surface side of the counterweight.
(3) In the working vehicle according to the present invention, it is preferred that the body frame has a plurality of through holes that respectively correspond to the plurality of fixing bolts. It is preferred that the counterweight have a plurality of female threads that correspond to the plurality of fixing bolts respectively.
(4) In the working vehicle according to the present invention, out of the plurality of fixing bolts, two fixing bolts disposed at positions on both sides of the tying-down portion in a sandwiching manner are assumed as two first fixing bolts. It is preferred that a shim having a cutout is formed on a periphery of each of the above-mentioned two first fixing bolts that are positioned between the body frame and the counterweight.
(5) In the working vehicle according to the present invention, it is preferred that the shim have a U shape.
(6) In the working vehicle according to the present invention, it is preferred that the shim is mounted in a posture that an opening of the shim is directed toward an outside in a vehicle width direction.

Advantageous Effects of Invention

According to the working vehicle of the present invention, the counterweight is mounted on the body frame "by the plurality of fixing bolts that threadedly engage with the counterweight by way of the body frame from the lower surface side of the body frame". Accordingly, the lateral rib that is necessary in the prior art can be eliminated from the body frame and hence, a battery removing operation can be performed easily even when the battery is not largely lifted. Further, with the elimination of the lateral rib, a step of mounting the lateral rib to longitudinal ribs by welding becomes unnecessary. In a case where rigidity of the body frame becomes insufficient, it is possible to use the counterweight also as a reinforcing member for reinforcing the body frame.

Further, the counterweight is mounted on the vehicle rear portion of the body frame and hence, the counterweight functions as a reinforcing member for the tying-down portion disposed on the vehicle rear portion.

DETAILED DESCRIPTION

Figure 1:
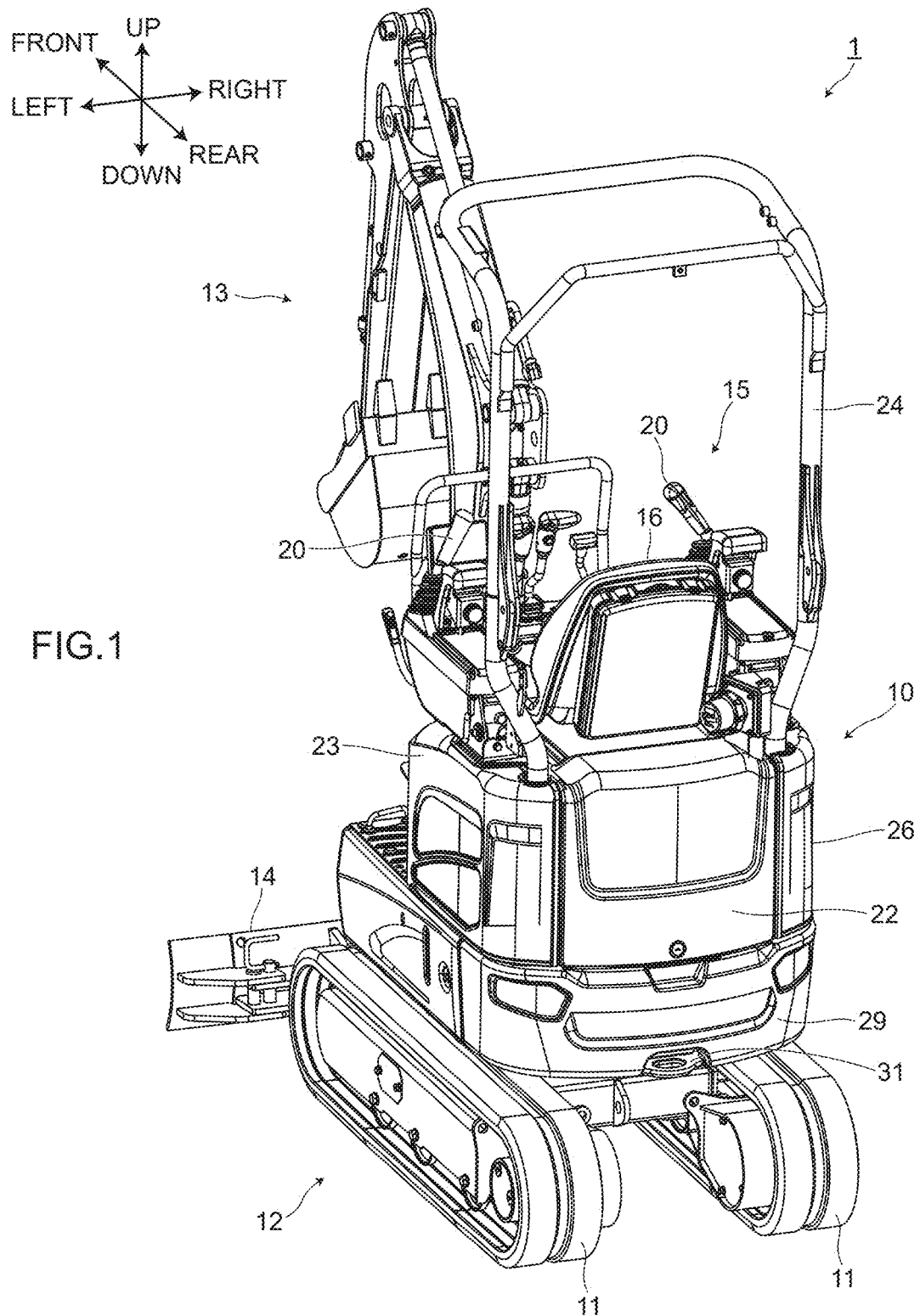
FIG. 1 is an external appearance perspective view of a working vehicle 1 according to an embodiment as viewed from an oblique rear side.

Hereinafter, the configuration of a working vehicle 1 according to an embodiment is described with reference to drawings. In the embodiment illustrated hereinafter, as an example of the working vehicle, the description is made by using a crawler-type hydraulic excavator. FIG. 1 is an external appearance perspective view of the working vehicle 1 according to the embodiment as viewed from a rear side. The external appearance configuration of the working vehicle 1 according to the embodiment does not constitute the gist of the present invention and hence, the external appearance configuration is schematically described. In the respective drawings for describing the embodiment, members having the identical functions are given with the same symbols, and there may be a case where the repeated description is omitted.

Overall Configuration

Figure 2:
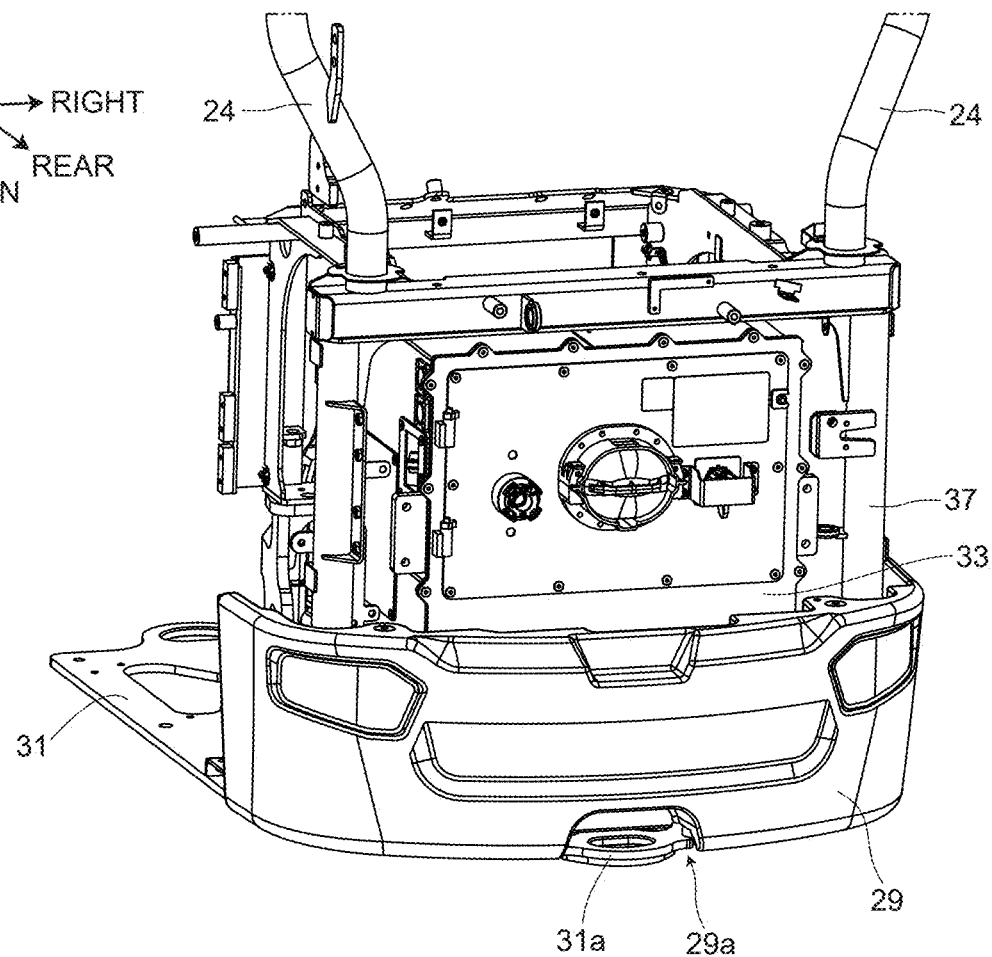
FIG. 2 is a perspective view of a main part of the working vehicle 1 according to the embodiment as viewed from an oblique rear side.
Figure 3:
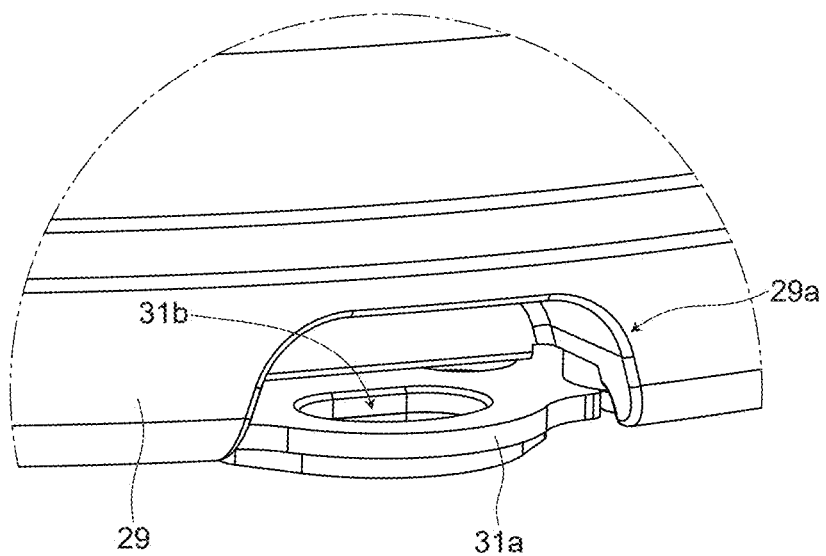
FIG. 3 is a view illustrating a state where a tying-down portion 31a is exposed from a recessed portion 29a of a counterweight 29.
Figure 4:
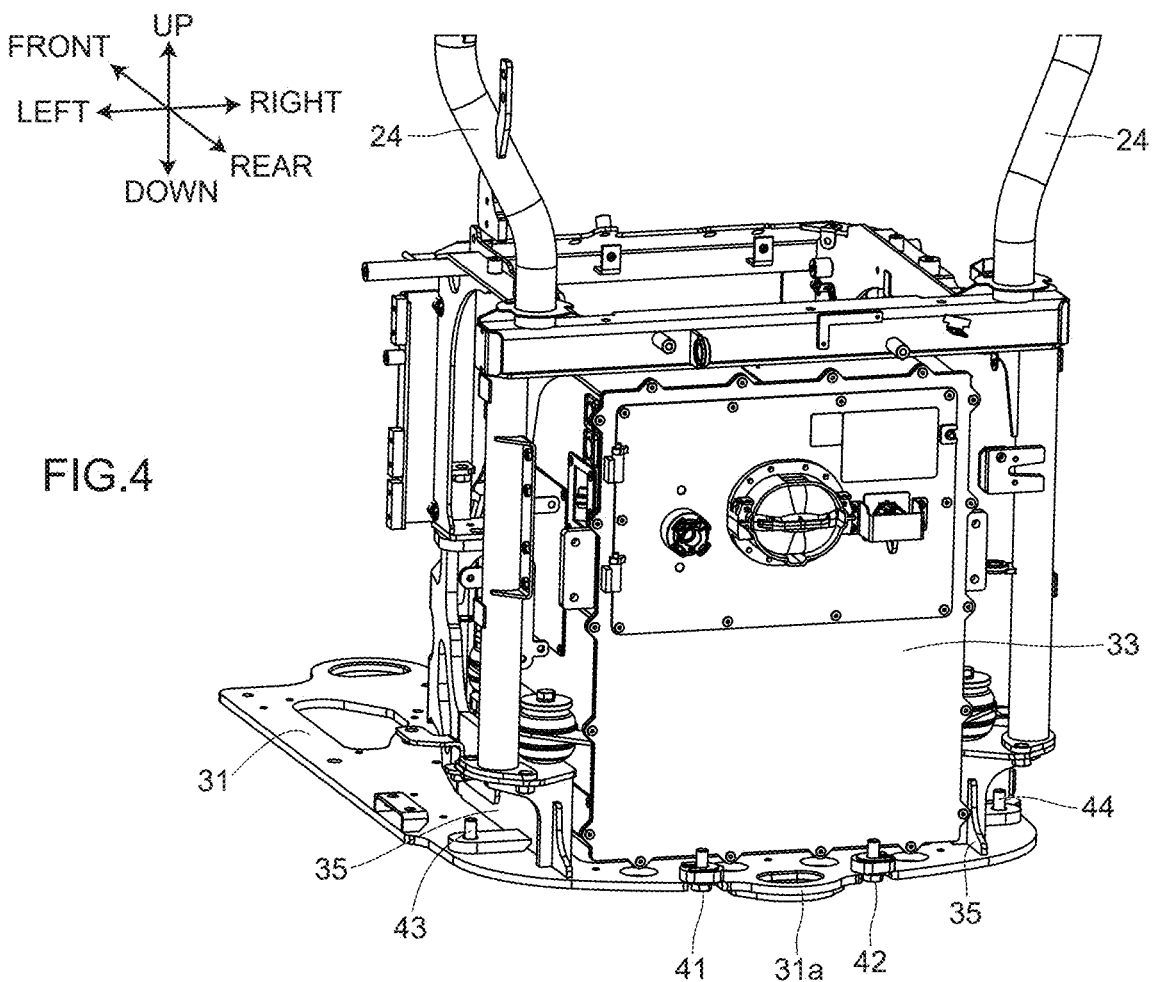
FIG. 4 is a perspective view of the working vehicle 1 according to the embodiment in a state where the counterweight is removed from the main part of the working vehicle 1.
Figure 5:
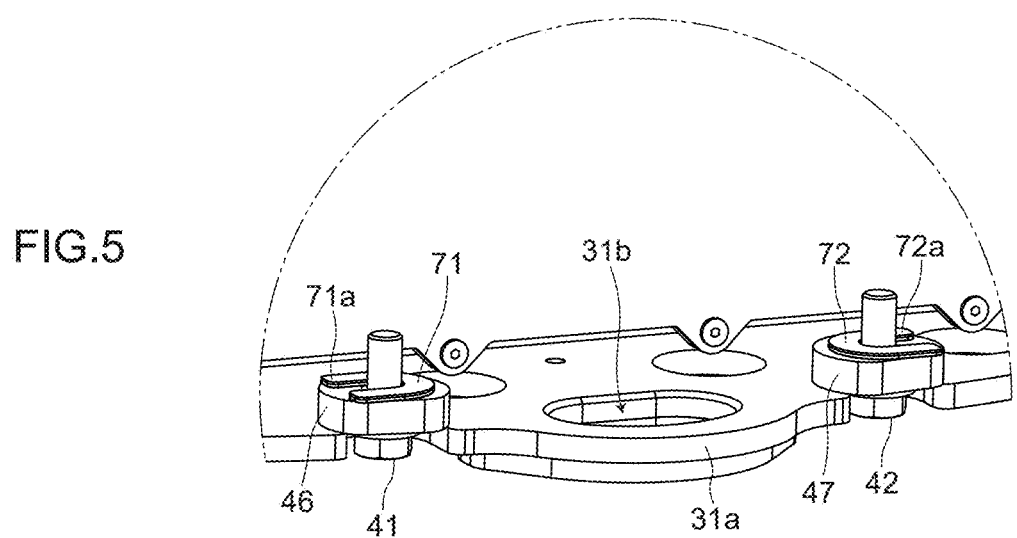
FIG. 5 is a view for illustrating mounting of the counterweight on a body frame.

In FIG. 1, FIG. 2 and FIG. 4 that are used in the description made hereinafter, the directions of the respective constitutional members with respect to a vehicle body 10 are indicated by arrows, that is, with respect to the respective directions, a side of a left side surface of the working vehicle 1 when the working vehicle 1 is viewed from an oblique rear side is set as "left", a side on a right side surface of the working vehicle 1 when the working vehicle 1 is viewed from the rear side is set as "right". Further, a bottom portion side of the working vehicle 1 is set as "down", and a side opposite to the bottom portion is set as "up". FIG. 2 is a perspective view of a main part of the working vehicle 1 according to the embodiment as viewed from an oblique rear side. FIG. 3 is a view illustrating a state where a tying-down portion 31a is exposed from a recessed portion 29a of a counterweight 29. FIG. 4 is a perspective view of the working vehicle 1 according to the embodiment in a state where the counterweight 29 is removed from the main part of the working vehicle 1. FIG. 5 is a view for illustrating mounting of the counterweight 29 on the body frame 31.

As illustrated in FIG. 1, the working vehicle 1 includes: a traveling device 12; a vehicle body 10 that is mounted on an upper portion of a traveling device 12 in a slewable manner; a blade device 14 that is mounted on a front portion of the traveling device 12; and a working device 13 that is mounted on a front portion of the vehicle body 10. The body frame 31 is mounted on the vehicle body 10, and longitudinal ribs 35 for increasing rigidity of the body frame are mounted on both left and right ends of the body frame 31 (see FIG. 4). The body frame 31 is rotatably mounted on the traveling device 12 about an axis extending in a vertical direction. On an upper portion of a rear portion of the body frame 31, a counterweight 29 for increasing stability of the vehicle by adjusting a weight balance is provided.

The traveling device 12 includes a pair of crawlers 11 on lower sides of both ends of the vehicle body 10 in the vehicle width direction (left-right-direction). The working device 13 is a working device on which a bucket is mounted as an attachment. The vehicle body 10, the traveling device 12, the working device 13 and the blade device 14 are driven by hydraulic actuators (hydraulic motors, hydraulic cylinders and the like) corresponding to the above-mentioned devices.

A rear surface, a left side surface, a right side surface and a front surface of the vehicle body 10 are respectively covered by a rear surface cover 22 (see FIG. 1), a left side surface cover 23, a right side surface cover 26 and a front surface cover (not illustrated in the drawing).

Then, a canopy type operation chamber 15 is mounted on the vehicle body 10. The operation chamber 15 includes a canopy pole 24, an operator seat 16, an operating lever 20 and the like.

The vehicle body 10 incorporates a hydraulic pump (not illustrated in the drawing), a battery that supplies electricity (for example, a battery pack) 33 and a power source circuit (not illustrated in the drawing) therein. The battery 33 is disposed on an upper side of the body frame 31 and on a vehicle rear portion side. The traveling device 12, a working device 13 and the blade device 14 are described in the same manner as a known working vehicle and hence, the description of these constitutional elements is omitted.

Working Vehicle 1

Figure 8:
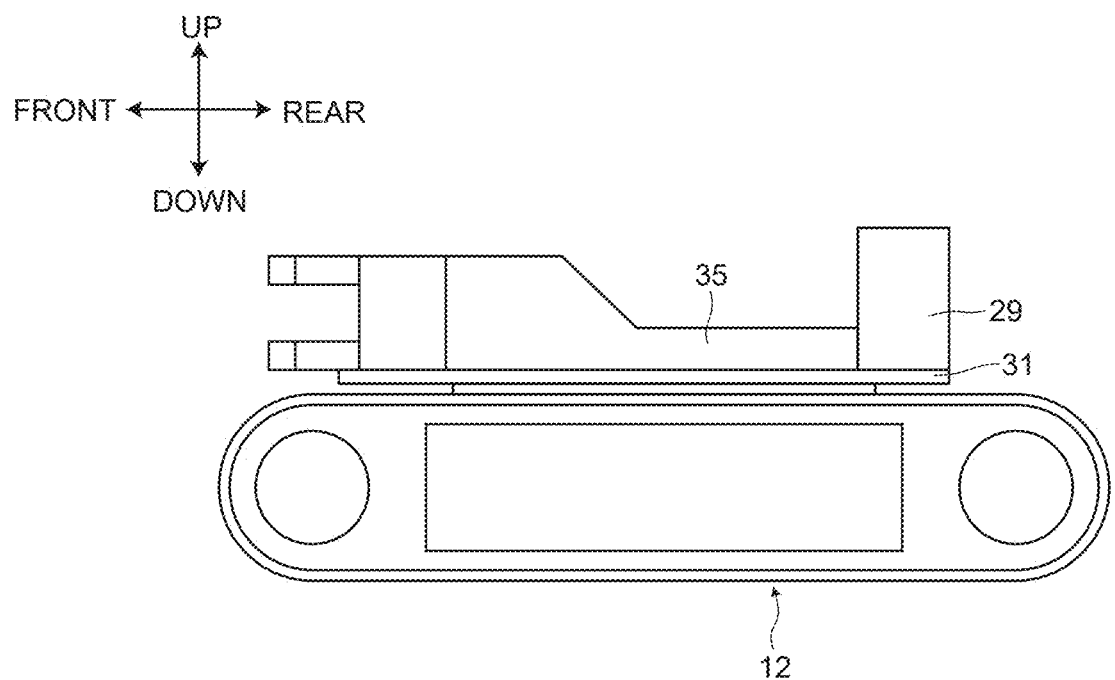
FIG. 8 is a view for describing the positional relationship between the counterweight 29 and a body frame 31.
Figure 9:
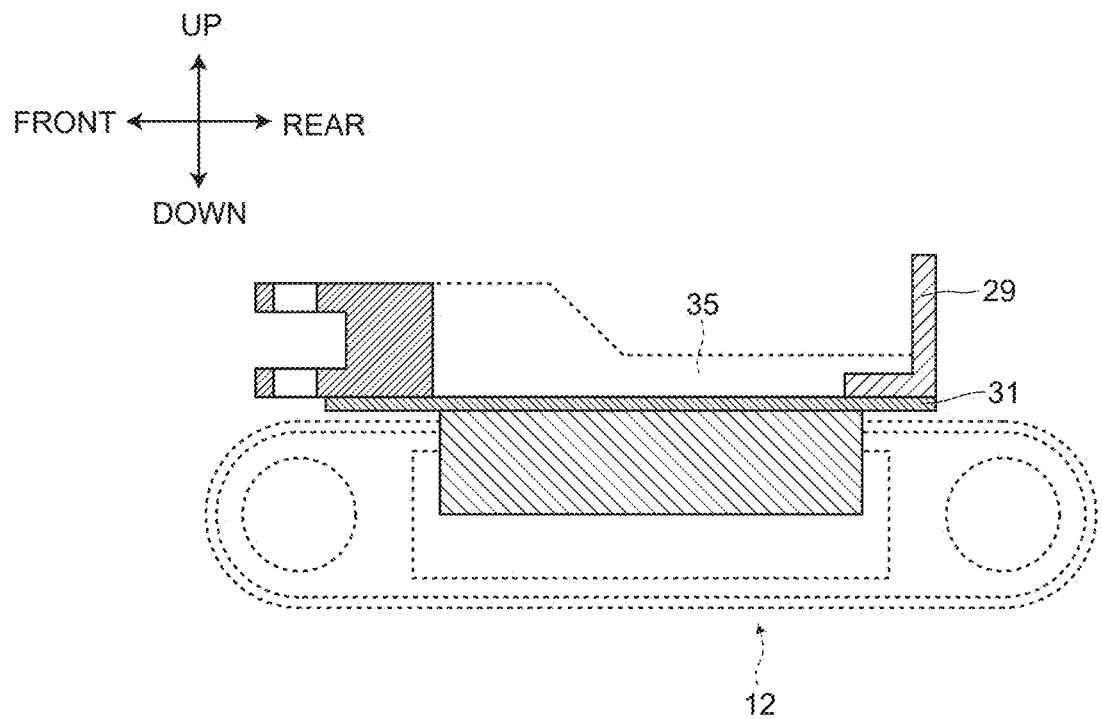
FIG. 9 is a partially see-through side view illustrating the positional relationship between the counterweight 29 and the body frame 31.

FIG. 8 is a view for describing the positional relationship between the counterweight 29 and the body frame 31. FIG. 9 is a partially see-through side view illustrating the positional relationship between the counterweight 29 and the body frame 31. As illustrated in FIG. 1, FIG. 2, FIG. 8 and FIG. 9, the working vehicle 1 according to the embodiment includes the traveling device 12, the body frame 31 that is mounted on the traveling device 12 and has a tying-down portion 31a disposed on a rear portion of the vehicle, and the counterweight 29 that is mounted on the rear portion of the vehicle of the body frame 31 and on an upper side of the body frame 31.

Counterweight 29

In the working vehicle 1 according to the embodiment, the counterweight 29 is mounted on the body frame 31 "by fixing bolts 41, 42, 43, 44 that threadedly engage with the counterweight 29 by way of the body frame 31 from a lower surface side of the body frame 31" (see FIG. 4).

The body frame 31 includes a tying-down portion 31a on a vehicle rear portion, and a recessed portion 29a for exposing the tying-down portion 31a is formed on a lower surface side of the counterweight 29 (see FIG. 3).

Figure 6:
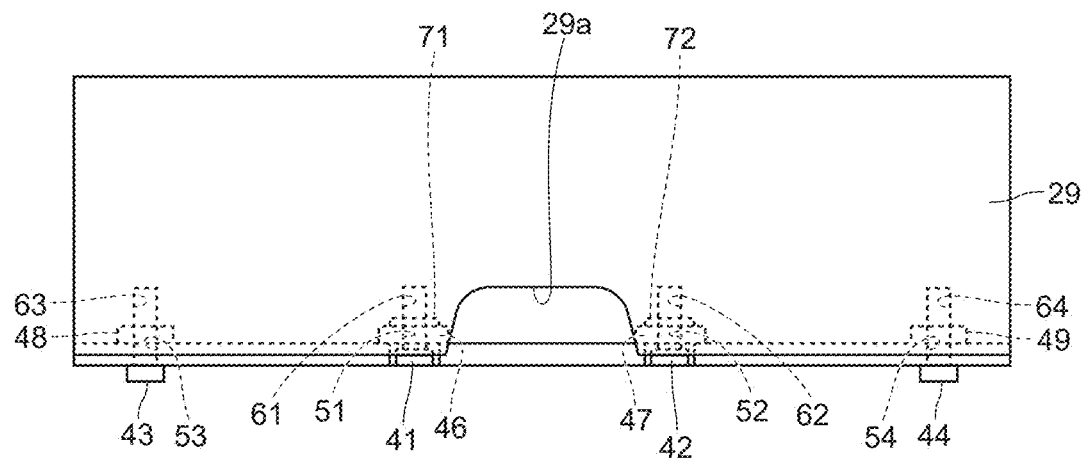
FIG. 6 is a view illustrating a state where shims 71, 72 are mounted on fixing bolts 41, 42.
Figure 7:
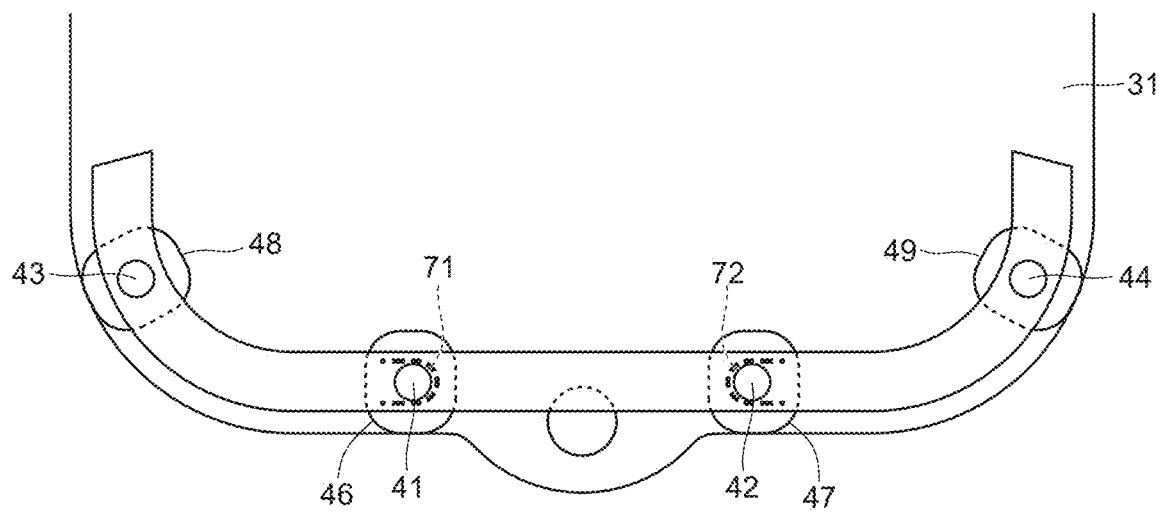
FIG. 7 is a view illustrating a state where the shims 71, 72 are mounted on the fixing bolts 41, 42, and is a view as viewed from above in FIG. 6.

FIG. 6 is a view for illustrating a state where shims 71, 72 are mounted on the fixing bolts 41, 42. FIG. 7 is a view for illustrating a state where shims 71, 72 are mounted on the fixing bolts 41, 42, and is a view when FIG. 6 is viewed from above. Female threads 61, 62 are formed in a lower side portion of the counterweight 29 at positions that correspond to positions at which through holes 51, 52 described later (see FIG. 6) are formed. Further, female threads 63, 64 are formed in the lower side portion of the counterweight 29 on left and right sides of the female threads 61, 62 with a predetermined distance at positions that correspond to the positions at which through holes 53, 54 described later (see FIG. 6) are formed.

Body Frame 31

In the working vehicle 1 according to the embodiment, on a rear portion of the body frame 31, a tying-down portion 31a having an opening portion 31b and provided for fixing the working vehicle 1 by a wire rope or the like is formed (see FIG. 3). In the vicinity of both sides of the tying-down portion 31a that constitutes the body frame 31, plates 46, 47 are formed (see FIG. 5). As illustrated in FIG. 6, through holes 51, 52 that allow the fixing bolts 41, 42 to pass therethrough are formed in the plates 46, 47 respectively. Further, plates 48, 49 are respectively formed outside the positions at which the through holes 51, 52 are formed on left and right sides with a predetermined distance. Through holes 53, 54 that allow fixing bolts 43, 44 to pass therethrough are formed in the plates 48, 49 respectively.

In the working vehicle 1 according to the embodiment, out of fixing bolts 41, 42, 43, 44, assuming two fixing bolts 41, 42 that are disposed at the positions on both sides of the tying-down portion 31a in a sandwiching manner as two first fixing bolts 41, 42, on peripheries of two respective first fixing bolts 41, 42 that are positioned between the body frame 31 and the counterweight 29, shims 71, 72 each having a cutout are mounted. (see FIG. 5, FIG. 6 and FIG. 7). In this embodiment, the shims 71, 72 are formed in a U shape. However, provided that the shims 71, 72 are formed in a shape having a cutout, the shape of the shims 71, 72 is not limited to such a shape.

In the working vehicle 1 according to the embodiment, the shims 71, 72 are mounted in a posture where an opening of the shims 71, 72 is directed toward the outside in a vehicle width direction. (see FIG. 7).

In general, there has been known a type of the body frame where a reinforcing rib (a lateral rib that connects and fixes a pair of longitudinal ribs to each other) is mounted on the body frame for increasing the rigidity of the body frame. A counterweight is fixed to the lateral rib. According to the working vehicle 1 of the embodiment, it is possible to make the lateral rib unnecessary while maintaining the rigidity of the body frame 31. Since the lateral rib can be eliminated, a step of mounting the counterweight on the longitudinal ribs become unnecessary and hence, an assembling operation efficiency can be enhanced.

Fixing of Counterweight 29 to Body Frame 31

Hereinafter, fixing of the counterweight 29 to the body frame 31 is described with reference to FIG. 5 and FIG. 6.

As illustrated in FIG. 5 and FIG. 6, the first fixing bolt 41 threadedly engages with the female threads 61 from the lower side of the body frame 31 through the through hole 51, the plate 46 and the shim 71. The first fixing bolt 42 threadedly engages with the female threads 62 from the lower side of the body frame 31 through the through hole 52, the plate 47 and the shim 72. The second fixing bolt 43 threadedly engages with the female threads 63 from the lower side of the body frame 31 through the through hole 53 and the plate 48. The second fixing bolt 44 threadedly engages with the female threads 64 from the lower side of the body frame 31 through the through hole 54 and the plate 49. In this manner, the counterweight 29 is fixed to a rear edge end portion of the body frame 31.

Accordingly, the body frame 31 has the through holes 51, 52, 53, 54 that correspond to the fixing bolts 41, 42, 43, 44 respectively. The counterweight 29 has the female threads 61, 62, 63, 64 that correspond to the fixing bolts 41, 42, 43, 44 respectively. Accordingly, it is possible to easily fix the counterweight 29 to the body frame 31.

The shims 71, 72 are members (position adjusting members) that adjust the height positions of the counterweight 29 from the body frame 31. In the respective shims 71, 72, openings (cutouts) 71a, 72a having a U shape are formed. The shims 71, 72 are mounted on respective peripheries of two fixing bolts 41, 42 that are positioned between the body frame 31 and the counterweight 29 in a state where the openings (cutouts) 71a, 72a having a U shape are directed toward the outside in the vehicle width direction. Accordingly, the shims 71, 72 can be inserted in the lateral direction from the recessed portion 29a side and hence, the insertion operation of the shims 71, 72 can be performed more easily. Accordingly, the height position adjustment of the counterweight can be performed by a simple operation.

Advantageous Effects of the Embodiment

According to the working vehicle 1 of the present embodiment, the counterweight 29 is mounted on the body frame 31 by the fixing bolts 41, 42, 43, 44 that threadedly engage with the counterweight 29 from the lower surface side of the body frame 31 by way of the body frame 31. Accordingly, operability of mounting and dismounting the counterweight 29 can be enhanced. Further, the lateral rib becomes unnecessary. Accordingly, compared to the conventional structure where the lateral rib exists and the battery is disposed in front of the lateral rib, it becomes unnecessary to lift the battery 33 at the time t of mounting or dismounting the battery 33. Accordingly, mounting or dismounting of the battery 33 that is positioned inside the counterweight 29 can be easily performed. Further, the lateral rib can be eliminated and hence, a step of mounting the lateral rib to the longitudinal ribs by welding can be eliminated.

Further, according to the working vehicle 1 of the embodiment, the counterweight 29 is mounted on the body frame 31 and hence, the counterweight 29 performs substantially the same function as the conventional reinforcing rib whereby the counterweight 29 can compensate for rigidity of the body frame.

Further, the counterweight 29 is mounted on the vehicle rear portion of the body frame 31. Accordingly, the counterweight 29 functions as a reinforcing member for the tying-down portion 31a disposed on the vehicle rear portion.

Further, according to the working vehicle 1 of the embodiment, a recessed portion (cutout) 29a for exposing the tying-down portion 31a is formed on a lower surface side of the counterweight 29. Accordingly, even through the counterweight 29 is mounted on the vehicle rear portion of the body frame 31, there is no possibility that the counterweight 29 impairs the function of the tying-down portion 31a.

Further, according to the working vehicle 1 of the embodiment, the body frame 31 has the through holes 51, 52, 53, 54 that correspond to the fixing bolts 41, 42, 43, 44 respectively, and the counterweight 29 has the female threads 61, 62, 63, 64 that correspond to the fixing bolts 41, 42, 43, 44 respectively. Accordingly, fixing of the counterweight to the body frame can be facilitated.

Further, according to the working vehicle 1 of the embodiment, the shims 71, 72 each having the cutout are mounted on the peripheries of two first fixing bolts 41, 42 positioned between the body frame 31 and the counterweight 29 respectively. Accordingly, the shims 71, 72 can be inserted from the side and hence, an insertion operation of the shims 71, 72 can be facilitated.

Further, according to the working vehicle 1 of the embodiment, the shims 71, 72 have a U shape and hence, the shims 71, 72 can be inserted more easily.

Further, according to the working vehicle 1 of the embodiment, the shims 71, 72 are mounted in a posture where the openings are directed toward the outside in the vehicle width direction and hence, the shims 71, 72 can be inserted from the recessed portion 29a side and hence, the insertion operation of the shims 71,72 can be further facilitated.

The present invention is not limited to the above-mentioned embodiment, and various modifications are conceivable without departing from the gist of the present invention. For example, the following modifications are also conceivable.

(1) In the above-mentioned embodiment, as the working vehicle, the working vehicle driven by an electric motor is used. However, the present invention is not limited to such a motor. For example, a working vehicle driven by an engine may be used.

(2) In the above-mentioned embodiment, as the working vehicle, the working vehicle that uses crawlers as the traveling device is used. However, the present invention is not limited to such a device. For example, a working vehicle that uses tires as a traveling device may be used.

(3) In the above-mentioned embodiment, as the working device that the working vehicle includes, a bucket is used. However, the present invention is not limited to such a device. For example, a breaker may be used.

The invention claimed is:

1. A working vehicle comprising:
a body frame having a plurality of through holes through which a plurality of fixing bolts pass, respectively; and
a counterweight having a plurality of female threads, the counterweight being mounted on a vehicle rear portion of the body frame by threadedly engaging the plurality of fixing bolts, which pass through the plurality of through holes of the body frame from a lower surface side of the body frame, with the plurality of female threads of the counterweight, respectively.

2. The working vehicle according to claim 1, wherein
the body frame includes a tying-down portion on the vehicle rear portion, and
a recessed portion for exposing the tying-down portion is formed on a lower surface side of the counterweight.

3. The working vehicle according to claim 2, wherein
out of the plurality of fixing bolts, two fixing bolts disposed at positions on both sides of the tying-down portion in a sandwiching manner are defined as two first fixing bolts, and
a shim having a cutout is formed on a periphery of each of the two first fixing bolts that is positioned between the body frame and the counterweight.

4. The working vehicle according to claim 3, wherein the shim has a U shape.

5. The working vehicle according to claim 3, wherein the shim is mounted in a posture that an opening of the shim is directed toward an outside in a vehicle width direction.

6. The working vehicle according to claim 1, wherein
the body frame includes a tying-down portion on the vehicle rear portion,
out of the plurality of fixing bolts, two fixing bolts disposed at positions on both sides of the tying-down portion in a sandwiching manner are defined as two first fixing bolts, and
a shim having a cutout is formed on a periphery of each of the two first fixing bolts that is positioned between the body frame and the counterweight.

7. The working vehicle according to claim 6, wherein the shim is mounted in a posture that an opening of the shim is directed toward an outside in a vehicle width direction.

* * * * *